United States Patent
Forsberg (10) Patent No.: US 8,284,941 B2
(45) Date of Patent: Oct. 9, 2012

(54) CHANGING RADIO ACCESS NETWORK SECURITY ALGORITHM DURING HANDOVER

(75) Inventor: Dan Forsberg, Helsinki (FI)

(73) Assignee: Nokia Corporation, Espoo (FI)

( * ) Notice: Subject to any disclaimer, the term of this patent is extended or adjusted under 35 U.S.C. 154(b) by 1187 days.

(21) Appl. No.: 11/723,909

(22) Filed: Mar. 22, 2007

(65) Prior Publication Data

US 2008/0205650 A1 Aug. 28, 2008

(30) Foreign Application Priority Data

Feb. 2, 2007 (FI) .................................... 20070094

(51) Int. Cl.
*H04L 29/06* (2006.01)
(52) U.S. Cl. .............................. 380/272; 726/3; 713/168
(58) Field of Classification Search .................. 380/272; 726/3; 713/168
See application file for complete search history.

(56) References Cited

U.S. PATENT DOCUMENTS

| | | | |
|---|---|---|---|
| 6,587,680 B1 * | 7/2003 | Ala-Laurila et al. | 455/411 |
| 6,876,747 B1 * | 4/2005 | Faccin et al. | 380/247 |
| 7,263,093 B1 * | 8/2007 | Vollmer | 370/352 |
| 7,403,621 B2 * | 7/2008 | Vialen et al. | 380/272 |
| 7,406,097 B2 * | 7/2008 | Kim | 370/466 |
| 7,486,952 B1 * | 2/2009 | Davies et al. | 455/436 |
| 7,532,596 B2 * | 5/2009 | Trossen et al. | 370/331 |
| 7,720,473 B2 * | 5/2010 | Kim et al. | 455/432.1 |
| 8,019,344 B2 * | 9/2011 | Faccin | 455/437 |
| 2002/0035682 A1 * | 3/2002 | Niemi et al. | 713/151 |
| 2004/0077335 A1 | 4/2004 | Lee et al. | |
| 2004/0228491 A1 * | 11/2004 | Wu | 380/272 |
| 2005/0176431 A1 * | 8/2005 | Herrero Veron | 455/436 |
| 2006/0019663 A1 * | 1/2006 | Cuffaro et al. | 455/436 |
| 2006/0035639 A1 * | 2/2006 | Etemad et al. | 455/436 |
| 2006/0233376 A1 * | 10/2006 | Forsberg et al. | 380/277 |
| 2006/0256763 A1 * | 11/2006 | Nguyen et al. | 370/338 |
| 2007/0003062 A1 * | 1/2007 | Mizikovsky et al. | 380/270 |
| 2007/0064647 A1 * | 3/2007 | Prasad | 370/331 |
| 2007/0117564 A1 * | 5/2007 | Reynolds | 455/436 |
| 2007/0154017 A1 * | 7/2007 | Yun et al. | 380/270 |
| 2009/0216906 A1 * | 8/2009 | Weniger et al. | 709/246 |

FOREIGN PATENT DOCUMENTS

| | | |
|---|---|---|
| EP | 1 379 030 A2 | 1/2004 |
| WO | WO 02/30132 A2 | 4/2002 |
| WO | WO 02/45453 A1 | 6/2002 |
| WO | WO 2005/015938 A1 | 2/2005 |

OTHER PUBLICATIONS

International Search Report, PCT/FI2008/050035 filed Jan. 31, 2008.

* cited by examiner

*Primary Examiner* — Michael Pyzocha
(74) *Attorney, Agent, or Firm* — Harrington & Smith (57) ABSTRACT

The invention allows changing a Radio Access Network security algorithm during handover in a manner that is efficient and secure. A security message is received at a mobile station previously using a first security algorithm in communication with a first access point, which message instructs to use a second security algorithm required by a second access point. In response, the mobile station is changed to use the second security algorithm.

24 Claims, 3 Drawing Sheets

CHANGING RADIO ACCESS NETWORK SECURITY ALGORITHM DURING HANDOVER

BACKGROUND OF THE INVENTION

1. Field of the Invention

The invention generally relates to telecommunications. In particular, the invention relates to changing a security algorithm during handover which security algorithm is used in a Radio Access Network.

2. Description of the Related Art

Typically only one security algorithm—if even that—is used today to secure telecommunications traffic over a Radio Access Network. For example, present implementations of Third Generation Partnership Project (3GPP) mobile telecommunications networks typically implement one security algorithm for such a purpose. It is to be understood that, in the present context, "security" comprises at least one of ciphering and integrity protection.

However, it is expected that future embodiments of mobile telecommunications networks will implement at least two security algorithms to secure telecommunications traffic over a Radio Access Network work. Thus, for example, if one security algorithm is compromised by an intruder, the compromised security algorithm can be replaced with another one. An example of such a mobile telecommunications network technology that supports multiple security algorithms is LTE (Long Term Evolution) enhanced 3GPP mobile telecommunications network technology.

Yet, at the same time, a single network element might support only a portion of available multiple security algorithms. For example, a mobile station might support a first security algorithm and a second security algorithm, while a present base station might support (or e.g. simply prefer) only the second security algorithm. In such a case, if the mobile station was previously communicating with a prior base station using the first security algorithm, the mobile station will have to switch over to using the second security algorithm when it starts to communicate with the present base station (due to e.g. being handed over from the prior base station to the present base station).

Presently, this switching over or changing of security algorithms is implemented via algorithm negotiations performed between a mobile station and a base station. Such prior art negotiations have significant drawbacks, however. For example, messages used in these negotiations are typically not secured. Rather, a mobile station and a base station exchange plaintext messages first about which security algorithms each one supports, and then about which one of the security algorithms will be selected for use in communication between the mobile station and the base station. Such prior art security algorithm negotiations are both inefficient and unsecured.

SUMMARY OF THE INVENTION

A first aspect of the present invention is a method in which a handover indication message is sent from a first access point using a first security algorithm in communication with a mobile station to a second access point which message indicates that the mobile station is about to be handed over from the first access point to the second access point. In response, a security requirement message is received from the second access point which message indicates that the second access point requires use of a second security algorithm. In response, a handover message is sent to the mobile station instructing the mobile station to handover to the second access point and to use the second security algorithm in communication with the second access point.

A second aspect of the present invention is a method in which a security message is received at a mobile station previously using a first security algorithm in communication with a first access point, which message instructs to use a second security algorithm required by a second access point. In response, the mobile station is changed to use the second security algorithm.

A third aspect of the present invention is a method in which a handover response message is received at a second access point requiring use of a second security algorithm from a mobile station which message is secured with a first security algorithm. In response, a security requirement message is sent to the mobile station indicating that the second access point requires use of the second security algorithm.

A fourth aspect of the present invention is an apparatus which comprises a first indicator configured to send, from a first access point using a first security algorithm in communication with a mobile station, a handover indication message to a second access point indicating that the mobile station is about to be handed over from the first access point to the second access point. The apparatus of the fourth aspect further comprises a second indicator configured to send, in response to receiving from the second access point a security requirement message indicating that the second access point requires use of a second security algorithm, to the mobile station a handover message instructing the mobile station to handover to the second access point and to use the second security algorithm in communication with the second access point.

A fifth aspect of the present invention is an apparatus which comprises a security algorithm changer configured to change a first security algorithm previously used in communication between a mobile station and a first access point to a second security algorithm required by a second access point in response to receiving a security message instructing to use the second security algorithm required by the second access point.

A sixth aspect of the present invention is an apparatus which comprises a fourth indicator configured to send, in response to receiving at a second access point requiring use of a second security algorithm a handover response message from a mobile station secured with a first security algorithm, a security requirement message to the mobile station indicating that the second access point requires use of the second security algorithm.

A seventh aspect of the present invention is a method in which a Context Transfer message is sent from a first Node-B using a first security algorithm in communication with a User Equipment to a second Node-B which message indicates that the User Equipment is about to be handed over from the first Node-B to the second Node-B. In response, a Context Transfer acknowledgement message is received from the second Node-B which message indicates that the second Node-B requires use of a second security algorithm. In response, a Handover Command message is sent to the User Equipment instructing the User Equipment to handover to the second Node-B and to use the second security algorithm in communication with the second Node-B.

An eighth aspect of the present invention is a method in which one of a Handover Command message and a Security Mode Command message is received at a User Equipment previously using a first security algorithm in communication with a first Node-B, which message instructs to use a second security algorithm required by a second Node-B. In response, the User Equipment is changed to use the second security algorithm.

A ninth aspect of the present invention is a method in which a Handover Command Response message is received at a second Node-B requiring use of a second security algorithm from a User Equipment which message is secured with a first security algorithm. In response, a Security Mode Command message is sent to the User Equipment indicating that the second Node-B requires use of the second security algorithm.

A tenth aspect of the present invention is a first Node-B which comprises a first indicator configured to send, from the first Node-B using a first security algorithm in communication with a User Equipment, a Context Transfer message to a second Node-B indicating that the User Equipment is about to be handed over from the first Node-B to the second Node-B. The first Node-B of the tenth aspect further comprises a second indicator configured to send, in response to receiving from the second Node-B a Context Transfer acknowledgement message indicating that the second Node-B requires use of a second security algorithm, to the User Equipment a Handover Command message instructing the User Equipment to handover to the second Node-B and to use the second security algorithm in communication with the second Node-B.

An eleventh aspect of the present invention is a User Equipment which comprises a security algorithm changer configured to change a first security algorithm previously used in communication between a User Equipment and a first Node-B to a second security algorithm required by a second Node-B in response to receiving one of a Handover Command message and a Security Mode Command message instructing to use the second security algorithm required by the second Node-B.

A twelfth aspect of the present invention is a second Node-B which comprises a fourth indicator configured to send, in response to receiving at a second Node-B requiring use of a second security algorithm a Handover Command Response message from a User Equipment secured with a first security algorithm, a Security Mode Command message to the User Equipment indicating that the second Node-B requires use of the second security algorithm.

In an embodiment of the invention, the method of the first aspect further comprises securing the handover message with the first security algorithm.

In an embodiment of the invention, the first security algorithm and the second security algorithm secure Radio Access Network traffic in the method of the first aspect.

In an embodiment of the invention, the securing of the Radio Access Network traffic comprises at least one of ciphering the Radio Access Network traffic and protecting the integrity of the Radio Access Network traffic, in the method of the first aspect.

In an embodiment of the invention, the method of the first aspect is performed by a data-processing device controlled by a computer program embodied on a computer readable medium.

In an embodiment of the invention, the method of the second aspect further comprises sending a handover response message secured with the second security algorithm to the second access point after the changing to use the second security algorithm.

In an embodiment of the invention, the received security message is a handover message received from the first access point further instructing the mobile station to handover to the second access point, in the method of the second aspect.

In an embodiment of the invention, the method of the second aspect further comprises sending a handover response message secured with the first security algorithm to the second access point, prior to the receiving of the security message and in response to performing a handover from the first access point to the second access point. Furthermore, in this embodiment, the received security message is a security requirement message received from the second access point indicating that the second access point requires use of the second security algorithm.

In an embodiment of the invention, the method of the second aspect further comprises including non-ciphered security algorithm information in the handover response message secured with the first security algorithm indicating that the first security algorithm was used to secure the handover response message.

In an embodiment of the invention, the method of the second aspect further comprises including non-ciphered mobile station security capability information in the handover response message secured with the first security algorithm indicating security capabilities of the mobile station.

In an embodiment of the invention, the method of the second aspect further comprises restarting securing Radio Access Network traffic in response to the changing to use the second security algorithm.

In an embodiment of the invention, the restarting of the securing of the Radio Access Network traffic comprises at least one of restarting ciphering the Radio Access Network traffic, restarting protecting the integrity of the Radio Access Network traffic, and deriving at least one of a new ciphering key and a new integrity protection key, in the method of the second aspect.

In an embodiment of the invention, the method of the second aspect is performed by a data-processing device controlled by a computer program embodied on a computer readable medium.

In an embodiment of the invention, the received handover response message includes non-ciphered mobile station security capability information indicating security capabilities of the mobile station, and the method further comprises including the mobile station security capability information in the security requirement message, in the method of the third aspect.

In an embodiment of the invention, the method of the third aspect further comprises protecting the integrity of the security requirement message with the second security algorithm.

In an embodiment of the invention, the method of the third aspect further comprises starting securing Radio Access Network traffic in response to the receiving of the handover response message.

In an embodiment of the invention, the starting of the securing of the Radio Access Network traffic comprises at least one of starting ciphering the Radio Access Network traffic, starting protecting the integrity of the Radio Access Network traffic, and deriving at least one of a new ciphering key and a new integrity protection key, in the method of the third aspect.

In an embodiment of the invention, the method of the third aspect is performed by a data-processing device controlled by a computer program embodied on a computer readable medium.

In an embodiment of the invention, the second indicator of the fourth aspect is further configured to secure the handover message with the first security algorithm.

In an embodiment of the invention, the first security algorithm and the second security algorithm of the fourth aspect are configured to secure Radio Access Network traffic.

In an embodiment of the invention, wherein the first security algorithm and the second security algorithm of the fourth aspect are configured to perform the securing of the Radio Access Network traffic by at least one of ciphering the Radio Access Network traffic and protecting the integrity of the Radio Access Network traffic.

In an embodiment of the invention, the apparatus of the fourth aspect is arranged in the first access point.

In an embodiment of the invention, the apparatus of the fifth aspect further comprises a third indicator configured to send a handover response message secured with the second security algorithm to the second access point in response to the security algorithm changer changing the first security algorithm to the second security algorithm.

In an embodiment of the invention, the received security message of the fifth aspect is a handover message received from the first access point further instructing the mobile station to handover to the second access point.

In an embodiment of the invention, the third indicator of the fifth aspect is further configured to send a handover response message secured with the first security algorithm to the second access point in response to performing a handover from the first access point to the second access point. Furthermore, the received security message is a security requirement message received from the second access point indicating that the second access point requires use of the second security algorithm.

In an embodiment of the invention, the third indicator of the fifth aspect is further configured to include non-ciphered security algorithm information in the handover response message secured with the first security algorithm indicating that the first security algorithm was used to secure the handover response message.

In an embodiment of the invention, the third indicator of the fifth aspect is further configured to include non-ciphered mobile station security capability information in the handover response message secured with the first security algorithm indicating security capabilities of the mobile station.

In an embodiment of the invention, the apparatus of the fifth aspect further comprises a traffic securing restarter configured to restart securing Radio Access Network traffic in response to the security algorithm changer changing the first security algorithm to the second security algorithm.

In an embodiment of the invention, the traffic securing restarter of the fifth aspect is further configured to perform the restarting of the securing of the Radio Access Network traffic by at least one of restarting ciphering the Radio Access Network traffic, restarting protecting the integrity of the Radio Access Network traffic, and deriving at least one of a new ciphering key and a new integrity protection key.

In an embodiment of the invention, the apparatus of the fifth aspect is arranged in the mobile station.

In an embodiment of the invention, the received handover response message of the sixth aspect includes non-ciphered mobile station security capability information indicating security capabilities of the mobile station, and the fourth indicator is further configured to include the mobile station security capability information in the security requirement message.

In an embodiment of the invention, the fourth indicator of the sixth aspect is further configured to protect the integrity of the security requirement message with the second security algorithm.

In an embodiment of the invention, the apparatus of the sixth aspect further comprises a traffic securing starter configured to start securing Radio Access Network traffic in response to the receiving of the handover response message.

In an embodiment of the invention, the traffic securing starter of the sixth aspect is further configured to perform the starting of the securing of the Radio Access Network traffic by at least one of starting ciphering the Radio Access Network traffic, starting protecting the integrity of the Radio Access Network traffic, and deriving at least one of a new ciphering key and a new integrity protection key.

In an embodiment of the invention, the apparatus of the sixth aspect is arranged in the second access point.

The embodiments of the invention described above may be used in any combination with each other. Several of the embodiments may be combined together to form a further embodiment of the invention. A method, an apparatus, a User Equipment or a Node-B which is an aspect of the invention may comprise at least one of the embodiments of the invention described above.

The invention allows changing a Radio Access Network security algorithm during handover in a manner that is efficient. Furthermore, the invention allows changing a Radio Access Network security algorithm during handover in a manner that is secure.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE PREFERRED EMBODIMENTS

Reference will now be made in detail to the embodiments of the invention, examples of which are illustrated in the accompanying drawings.

Figure 1A:
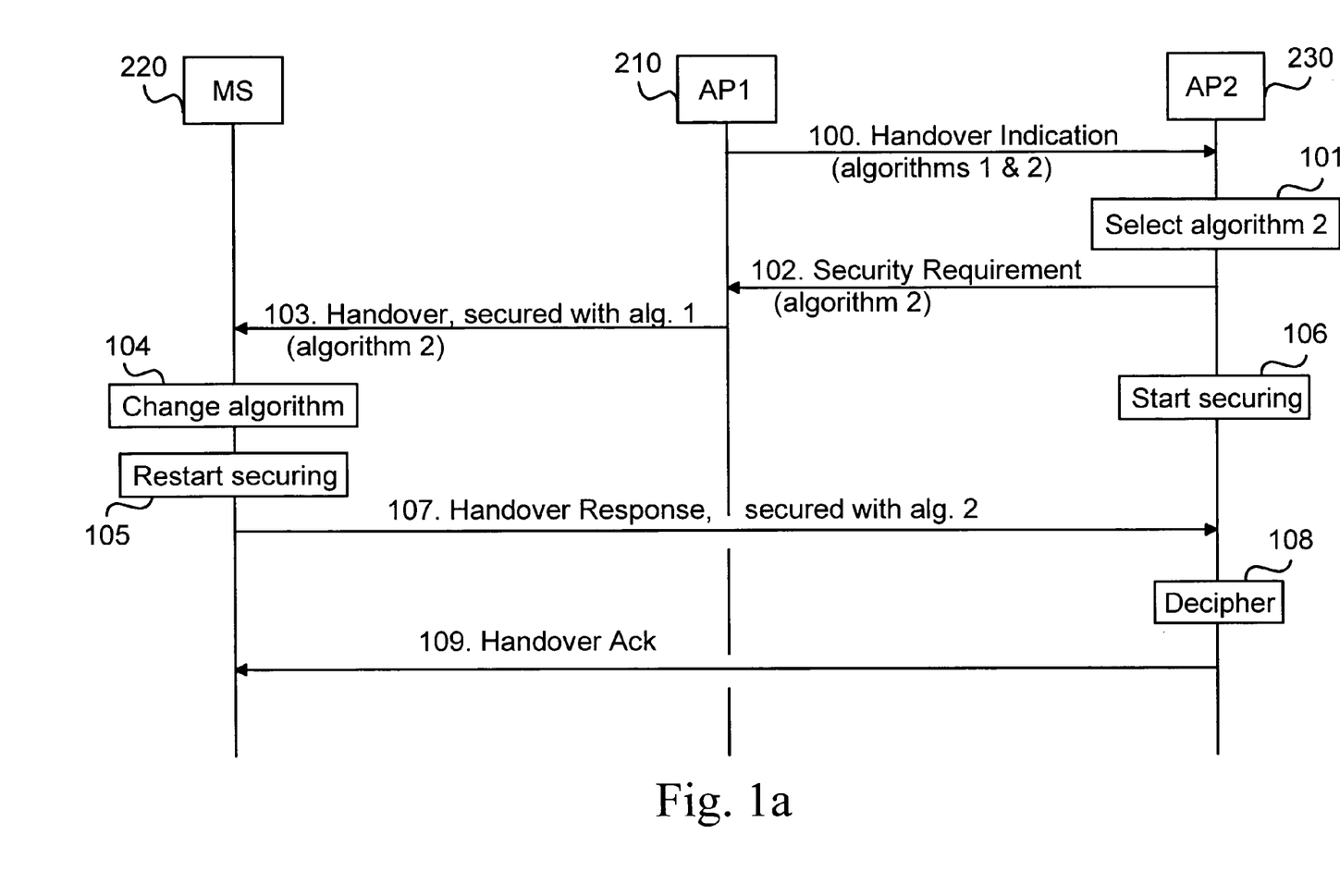
FIG. 1a is a signaling diagram illustrating a method according to an embodiment of the present invention.

FIG. 1a is a signaling diagram illustrating a method according to an embodiment of the present invention. At step 100, a first access point 210 sends a handover indication message to a second access point 230. The first access point 210 has been using a first security algorithm in communication with a mobile station 220. Therefore, the mobile station 220 has the first security algorithm presently activated. However, in the example illustrated in FIG. 1a, the mobile station 220 also supports a second security algorithm. The handover indication message indicates that the mobile station 220 is about to be handed over from the first access point 210 to the second access point 230. In an embodiment, the handover indication message includes information indicating which security algorithms the mobile station 220 supports (i.e. the first security algorithm and the second security algorithm in the example illustrated in FIG. 1a, as discussed above). Furthermore, in an embodiment, the handover indication message of step 100 may include at least one of access point security capability information indicating security capabilities of the first access point 210 and mobile station security capability information indicating security capabilities of the mobile station 220.

It is to be understood that, according to the present invention, at least one of the mobile station 220, the first access point 210 and the second access point 230 may support any multiple number of security algorithms.

In an embodiment, the first security algorithm and the second security algorithm are used to secure Radio Access Network traffic (i.e. telecommunications traffic between a access point and a mobile station), e.g. by at least one of ciphering the Radio Access Network traffic and protecting the integrity of the Radio Access Network traffic.

In response, the second access point 230 selects a preferred one out of the security algorithms supported by the mobile station 220, step 101. In the example illustrated in FIG. 1a, the second access point 230 selects the second security algorithm. At step 102, the second access point 230 sends a security requirement message to the first access point 210 which security requirement message indicates that the second access point 230 requires use of the second security algorithm (since the second access point 230 selected the second security algorithm as the preferred one at step 101).

In an embodiment, the security requirement message of step 102 may include the at least one of the access point security capability information indicating the security capabilities of the first access point 210 and the mobile station security capability information indicating the security capabilities of the mobile station 220 that the second access point 230 optionally received at step 100.

In response, a handover message is sent from the first access point 210 to the mobile station 220 instructing the mobile station 220 to handover to the second access point 230 and to use the second security algorithm in communication with the second access point 230, step 103. In an embodiment, the handover message is secured with the first security algorithm. By securing the handover message with the first security algorithm, the mobile station 220 will be able decipher the handover message (since the mobile station 220 is still using the first security algorithm) and yet the handover message will be protected against potential threats.

At the same time, at step 106, the second access point 230 starts to secure its Radio Access Network traffic using its selected second security algorithm e.g. by at least one of starting to cipher the Radio Access Network traffic, starting to protect the integrity of the Radio Access Network traffic, and deriving at least one of a new ciphering key and a new integrity protection key.

In response to receiving the above security message at the mobile station 220, the mobile station 220 changes or switches over to use the security algorithm indicated by the received security message, i.e. the second security algorithm in the example illustrated in FIG. 1a, step 104. At step 105, the securing of the Radio Access Network traffic is restarted at the mobile station 220 in response to the changing to use the second security algorithm. The restarting may comprise e.g. at least one of restarting ciphering the Radio Access Network traffic, restarting protecting the integrity of the Radio Access Network traffic, and deriving at least one of a new ciphering key and a new integrity protection key.

At step 107, a handover response message is sent from the mobile station 220 to the second access point 230. The handover response message is now secured with the second security algorithm, since the mobile station 220 switched over to use the second security algorithm at step 104. The second access point deciphers the received handover response message, step 108, and responds by sending a handover acknowledgement message, step 109.

Figure 1B:
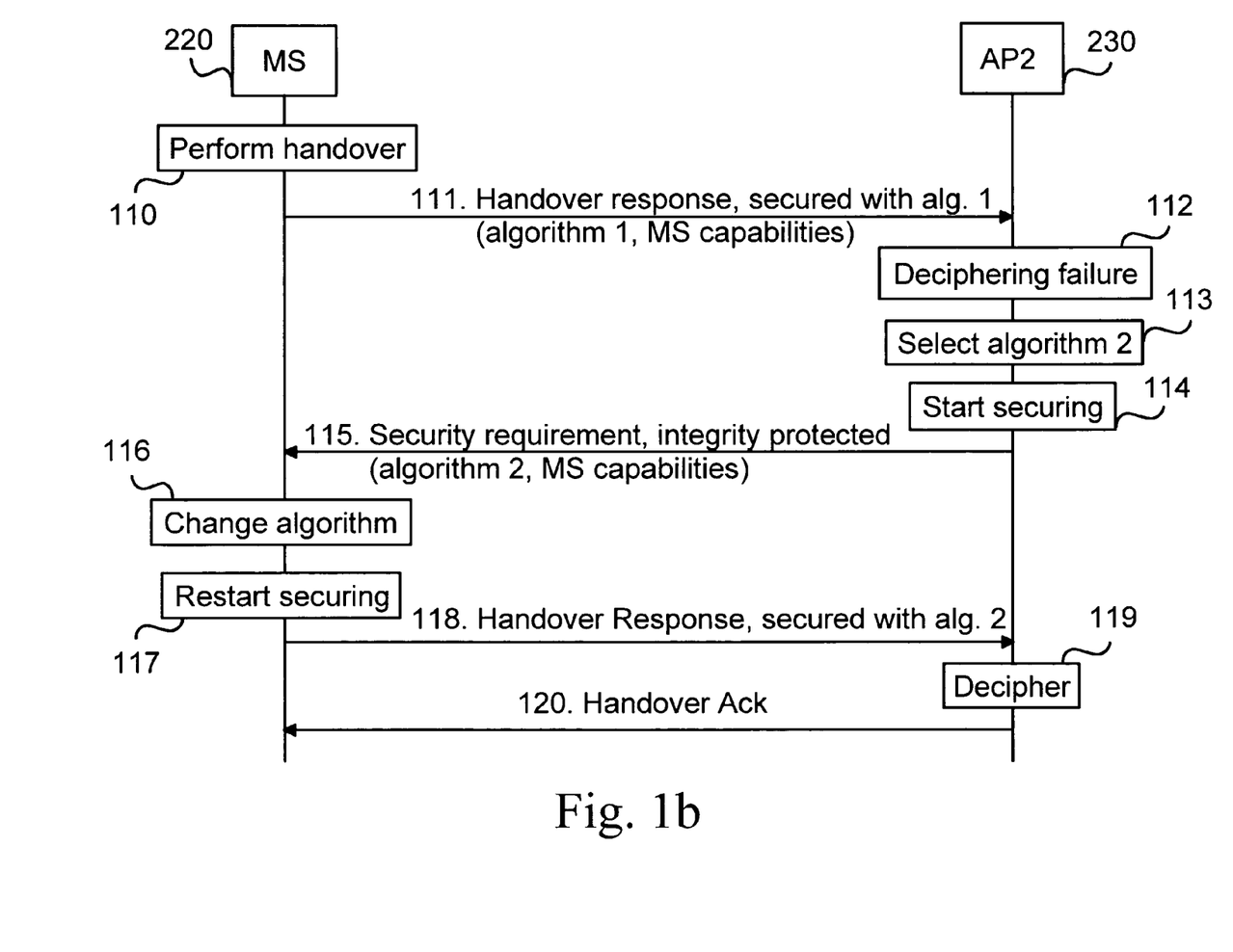
FIG. 1b is a signaling diagram illustrating a method according to another embodiment of the present invention.

FIG. 1b is a signaling diagram illustrating a method according to another embodiment of the present invention. At step 110, a handover is performed at a mobile station 220 from a first access point (not illustrated) to a second access point 230. In contrast to the case illustrated in FIG. 1a, this time the handover is unexpected and the mobile station 220 did not receive security algorithm related instructions from the first access point. Thus, the mobile station 220 assumes a first security algorithm that it used in communication with the first access point is still valid. In other words, the handover may be due to e.g. an error situation. For example, the mobile station 220 may have lost connection with the first access point.

At step 111, a handover response message is sent from the mobile station 220 to the second access point 230. The handover response message is secured with the first security algorithm, since the mobile station 220 assumes the first security algorithm that it used in communication with the first access point is still valid, as discussed above. Furthermore, in an embodiment, this handover response message of step 111 secured with the first security algorithm may include non-ciphered security algorithm information indicating which security algorithm (i.e. the first security algorithm in the example illustrated in FIG. 1b) was used to secure the handover response message. Furthermore, in an embodiment, this handover response message of step 111 secured with the first security algorithm may include non-ciphered mobile station security capability information indicating security capabilities of the mobile station 220.

At step 112, the second access point 230 attempts to decipher the received handover response message but fails due to not supporting the first security algorithm used to cipher it. However, if the received handover response message includes the above described non-ciphered security algorithm information, the second access point 230 will be able to deduce which security algorithm was used to cipher it. In any case, at step 113, the second access point 230 selects its preferred security algorithm. In the example illustrated in FIG. 1b, the second access point 230 selects the second security algorithm. At step 114, the second access point 230 starts to secure its Radio Access Network traffic using its selected second security algorithm e.g. by at least one of starting to cipher the Radio Access Network traffic, starting to protect the integrity of the Radio Access Network traffic, and deriving at least one of a new ciphering key and a new integrity protection key.

At step 115, the second access point 230 sends a security requirement message to the mobile station 220 indicating that the second access point 230 requires use of the second security algorithm. In an embodiment, the security requirement message includes the mobile station security capability information that the second access point 230 optionally received at step 111. Sending the mobile station security capability information back to the mobile station 220 allows the mobile station 220 to compare and find out whether the second access point 230 is using the same security capability set as the one the mobile station 220 indicated to the second access point 230 at step 111. Furthermore, in an embodiment, the integrity of the security requirement message is protected with the second security algorithm. This integrity protection protects against e.g. bidding-down attacks.

In response to receiving the above security message at the mobile station 220, the mobile station 220 changes or switches over to use the security algorithm indicated by the received security message, i.e. the second security algorithm in the example illustrated in FIG. 1b, step 1116. At step 117, the securing of the Radio Access Network traffic is restarted at the mobile station 220 in response to the changing to use the second security algorithm. The restarting may comprise e.g. at least one of restarting ciphering the Radio Access Network traffic, restarting protecting the integrity of the Radio Access Network traffic, and deriving at least one of a new ciphering key and a new integrity protection key.

At step 118, a handover response message is sent from the mobile station 220 to the second access point 230. The handover response message is now secured with the second security algorithm, since the mobile station 220 switched over to use the second security algorithm at step 116. The second access point deciphers the received handover response message, step 108, and responds by sending a handover acknowledgement message, step 120.

In an embodiment, the handover indication message of step 100 may be e.g. a Context Transfer message of a 3G mobile telecommunications network, or the like. Furthermore, the security requirement message of step 102 may be e.g. a Context Transfer acknowledgement message of a 3G mobile telecommunications network, or the like. Furthermore, the handover message of step 103 may be e.g. a Handover Command message of a 3G mobile telecommunications network, or the like. Furthermore, the handover response message of steps 107, 111 and 118 may be e.g. a Handover Command Response message of a 3G mobile telecommunications network, or the like. Furthermore, the security requirement message of step 115 may be e.g. a Security Mode Command message of a 3G mobile telecommunications network, or the like.

Figure 2:
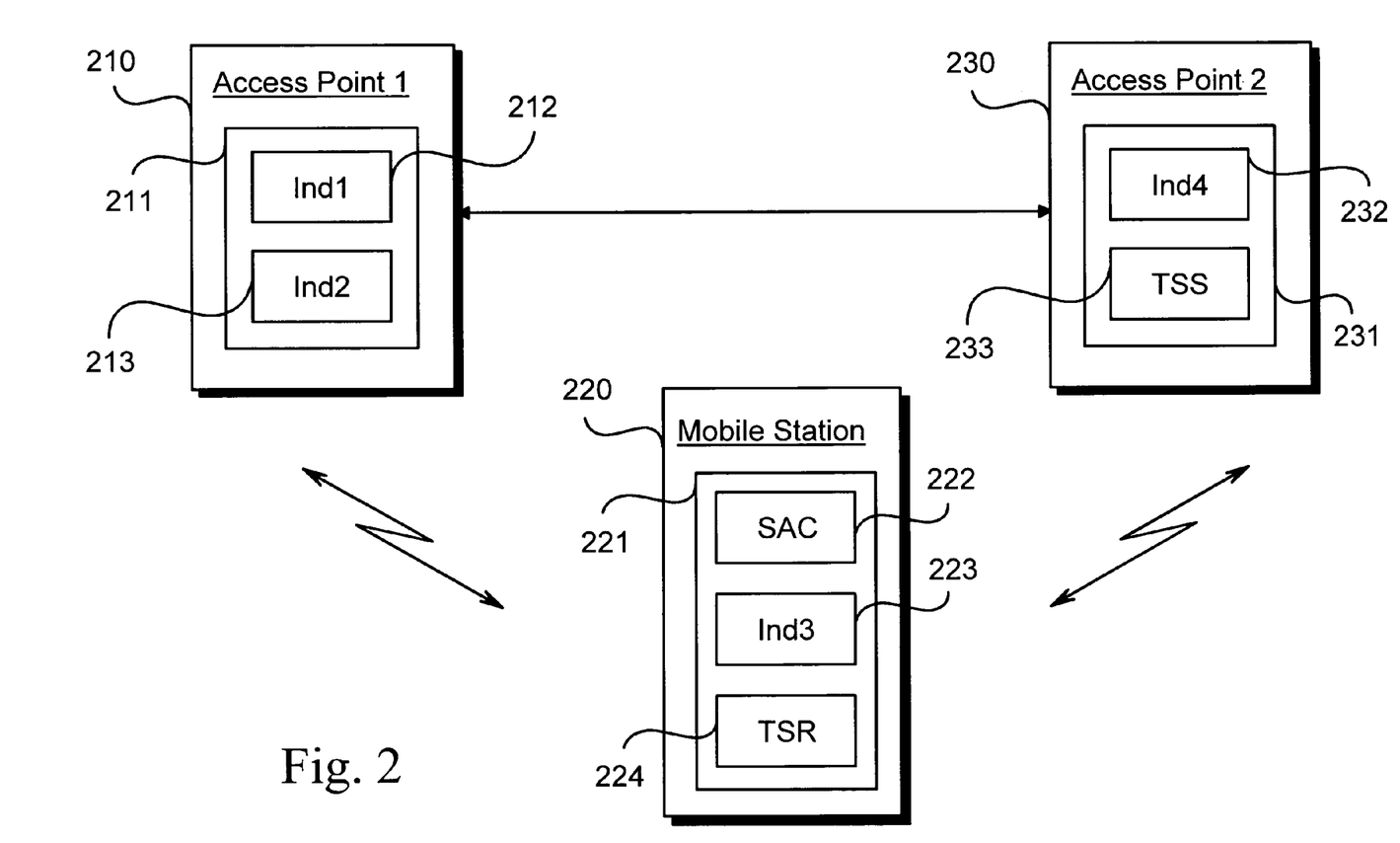
FIG. 2 is a block diagram illustrating apparatuses according to an embodiment of the present invention.

FIG. 2 is a block diagram illustrating apparatuses according to an embodiment of the present invention. FIG. 2 includes a first access point 210, a second access point 230 and a mobile station 220. The first access point 210 has been communicating with the mobile station 220 and utilizing a first security algorithm while doing so.

In the embodiment illustrated in FIG. 2, the first access point 210 comprises an apparatus 211 which comprises a first indicator 212 which is configured to send a handover indication message from the first access point 210 to the second access point 230 indicating that the mobile station 220 is about to be handed over from the first access point 210 to the second access point 230. The apparatus 211 further comprises a second indicator 213 which is configured to send to the mobile station 220 a handover message in response to receiving from the second access point 230 a security requirement message indicating that the second access point 230 requires use of a second security algorithm. The handover message instructs the mobile station 220 to handover to the second access point 230 and to use the second security algorithm while communicating with the second access point 230. In an embodiment, the first access point 210 may comprise a base station, an Access Router, an IPsec gateway (IPsec referring to "Internet protocol security" which is a suite of protocols for securing Internet Protocol communications), a relay station of a wireless ad hoc network, a Node-B network element of a 3G mobile telecommunications network, or the like.

In the embodiment illustrated in FIG. 2, the mobile station 220 comprises an apparatus 221 which comprises a security algorithm changer 222 which is configured to change the first security algorithm previously used in communication between the mobile station 220 and the first access point 210 to the second security algorithm required by the second access point 230 in response to receiving the security message instructing to use the second security algorithm required by the second access point 230. In the embodiment illustrated in FIG. 2, the apparatus 221 further comprises a third indicator 223 which is configured to send a handover response message secured with the second security algorithm to the second access point 230 in response to the security algorithm changer 222 changing the first security algorithm to the second security algorithm. In the embodiment illustrated in FIG. 2, the apparatus 221 further comprises a traffic securing restarter 224 configured to restart securing Radio Access Network traffic in response to the security algorithm changer 222 changing the first security algorithm to the second security algorithm. In an embodiment, the mobile station 220 may comprise a User Equipment of a 3G mobile telecommunications network, or the like.

In the embodiment illustrated in FIG. 2, the second access point 230 comprises an apparatus 231 which comprises a fourth indicator 232 which is configured to send a security requirement message to the mobile station 220 in response to receiving at the second access point 230 a handover response message from the mobile station 220 which handover response message is secured with the first security algorithm while the second access point 230 requires use of the second security algorithm. The security requirement message indicates that the second access point 230 requires use of the second security algorithm. In the embodiment illustrated in FIG. 2, the apparatus 231 further comprises a traffic securing starter 233 which is configured to start securing Radio Access Network traffic in response to the receiving of the handover response message. In an embodiment, the second access point 230 may comprise a base station, an Access Router, an IPsec gateway, a relay station of a wireless ad hoc network, a Node-B network element of a 3G mobile telecommunications network, or the like.

The exemplary embodiments can include, for example, any suitable servers, workstations, and the like, capable of performing the processes of the exemplary embodiments. The devices and subsystems of the exemplary embodiments can communicate with each other using any suitable protocol and can be implemented using one or more programmed computer systems or devices.

One or more interface mechanisms can be used with the exemplary embodiments, including, for example, Internet access, telecommunications in any suitable form (e.g., voice, modem, and the like), wireless communications media, and the like. For example, employed communications networks or links can include one or more wireless communications networks, cellular communications networks, 3G communications networks, 3G communications networks enhanced with LTE technology (Long Term Evolution), 3G communications networks enhanced with SAE technology (System Architecture Evolution), Public Switched Telephone Network (PSTNs), Packet Data Networks (PDNs), the Internet, intranets, a combination thereof, and the like.

It is to be understood that the exemplary embodiments are for exemplary purposes, as many variations of the specific hardware used to implement the exemplary embodiments are possible, as will be appreciated by those skilled in the hardware and/or software art(s). For example, the functionality of one or more of the components of the exemplary embodiments can be implemented via one or more hardware and/or software devices.

The exemplary embodiments can store information relating to various processes described herein. This information can be stored in one or more memories, such as a hard disk, optical disk, magneto-optical disk, RAM, and the like. One or more databases can store the information used to implement the exemplary embodiments of the present inventions. The databases can be organized using data structures (e.g., records, tables, arrays, fields, graphs, trees, lists, and the like) included in one or more memories or storage devices listed herein. The processes described with respect to the exemplary embodiments can include appropriate data structures for storing data collected and/or generated by the processes of the devices and subsystems of the exemplary embodiments in one or more databases.

All or a portion of the exemplary embodiments can be conveniently implemented using one or more general purpose processors, microprocessors, digital signal processors, micro-controllers, and the like, programmed according to the teachings of the exemplary embodiments of the present inventions, as will be appreciated by those skilled in the computer and/or software art(s). Appropriate software can be readily prepared by programmers of ordinary skill based on the teachings of the exemplary embodiments, as will be appreciated by those skilled in the software art. In addition, the exemplary embodiments can be implemented by the preparation of application-specific integrated circuits or by interconnecting an appropriate network of conventional component circuits, as will be appreciated by those skilled in the electrical art(s). Thus, the exemplary embodiments are not limited to any specific combination of hardware and/or software.

Stored on any one or on a combination of computer readable media, the exemplary embodiments of the present inventions can include software for controlling the components of the exemplary embodiments, for driving the components of the exemplary embodiments, for enabling the components of the exemplary embodiments to interact with a human user, and the like. Such software can include, but is not limited to, device drivers, firmware, operating systems, development tools, applications software, and the like. Such computer readable media further can include the computer program product of an embodiment of the present inventions for performing all or a portion (if processing is distributed) of the processing performed in implementing the inventions. Computer code devices of the exemplary embodiments of the present inventions can include any suitable interpretable or executable code mechanism, including but not limited to scripts, interpretable programs, dynamic link libraries (DLLs), Java classes and applets, complete executable programs, Common Object Request Broker Architecture (CORBA) objects, and the like. Moreover, parts of the processing of the exemplary embodiments of the present inventions can be distributed for better performance, reliability, cost, and the like.

As stated above, the components of the exemplary embodiments can include computer readable medium or memories for holding instructions programmed according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDR, CD-RW, DVD, DVD-ROM, DVD±RW, DVD±R, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While the present inventions have been described in connection with a number of exemplary embodiments, and implementations, the present inventions are not so limited, but rather cover various modifications, and equivalent arrangements, which fall within the purview of prospective claims.

What is claimed is:

1. A method, comprising:
    sending, from a first access point, a handover indication message to a second access point indicating that a mobile station is about to be handed over from the first access point to the second access point, where the handover indication message indicates a plurality of security algorithms which the mobile station supports;
    in response to sending the handover indication message, receiving, at a processor of the first access point, a security requirement message from the second access point indicating that the second access point requires use of a second security algorithm from the plurality of security algorithms which the mobile station supports; and
    in response to receiving the security requirement message, sending, from the first access point to the mobile station using a first security algorithm, a handover message instructing the mobile station to handover to the second access point and to use the second security algorithm in communication with the second access point,
    where the first security algorithm is different from the second security algorithm.

2. The method according to claim 1, wherein the first security algorithm and the second security algorithm secure Radio Access Network traffic.

3. The method according to claim 2, wherein the securing of the Radio Access Network traffic comprises at least one of ciphering the Radio Access Network traffic and protecting the integrity of the Radio Access Network traffic.

4. The method according to claim 1, wherein the method is performed by a data-processing device controlled by a computer program embodied on a non-transitory computer readable medium.

5. A method, comprising:
    receiving, from a first access point at a mobile station using a first security algorithm, a security message instructing the mobile station to use a second security algorithm required by a second access point; and
    in response to receiving the security message, changing, by a processor of the mobile station, to use the second security algorithm at the mobile station in communication with the second access point,
    wherein the received security message is a handover message received from the first access point further instructing the mobile station to handover to the second access point,
    where the first security algorithm is different from the second security algorithm.

6. The method according to claim 5, further comprising sending a handover response message secured with the second security algorithm to the second access point after the changing to use the second security algorithm.

7. The method according to claim 5, further comprising restarting securing Radio Access Network traffic in response to the changing to use the second security algorithm.

8. The method according to claim 7, wherein the restarting of the securing of the Radio Access Network traffic comprises at least one of restarting ciphering the Radio Access Network traffic, restarting protecting the integrity of the Radio Access Network traffic, and deriving at least one of a new ciphering key and a new integrity protection key.

9. The method according to claim 5, wherein the method is performed by a data-processing device controlled by a computer program embodied on a non-transitory computer readable medium.

10. An apparatus, comprising at least one processor; and at least one memory including computer program code, the at least one memory and the computer program code configured to, with the at least one processor, cause the apparatus to perform at least the following:

to send, from a first access point, a handover indication message to a second access point indicating that a mobile station is about to be handed over from the first access point to the second access point, where the handover indication message indicates a plurality of security algorithms which the mobile station supports;

in response to sending the handover indication message, receiving, a security requirement message from the second access point indicating that the second access point requires use of a second security algorithm from the plurality of security algorithms which the mobile station supports; and in response to receiving the security requirement message, to send, to the mobile station using a first security algorithm, a handover message instructing the mobile station to handover to the second access point and to use the second security algorithm in communication with the second access point, where the first security algorithm is different from the second security algorithm.

11. The apparatus according to claim 10, wherein the first security algorithm and the second security algorithm are configured to secure Radio Access Network traffic.

12. The apparatus according to claim 11, wherein the first security algorithm and the second security algorithm are configured to perform the securing of the Radio Access Network traffic by at least one of ciphering the Radio Access Network traffic and protecting the integrity of the Radio Access Network traffic.

13. The apparatus according to claim 10, wherein the apparatus is included in the first access point.

14. An apparatus, comprising at least one processor; and at least one memory including computer program code, the at least one memory and the computer program code configured to, with the at least one processor, cause the apparatus to perform at least the following:

receiving, from a first access point at a mobile station using a first security algorithm, a security message instructing the mobile station to use a second security algorithm required by a second access point; and to change to use the second security algorithm in communication with the second access point in response to receiving the security message, wherein the received security message is a handover message received from the first access point further instructing the mobile station to handover to the second access point, where the first security algorithm is different from the second security algorithm.

15. The apparatus according to claim 14, where the at least one memory and the computer program code are further configured to cause the apparatus:

to send a handover response message secured with the second security algorithm to the second access point in response to the security algorithm changer changing the first security algorithm to the second security algorithm.

16. The apparatus according to claim 14, where the at least one memory and the computer program code are further configured to cause the apparatus:

to restart securing Radio Access Network traffic in response to the security algorithm changer changing the first security algorithm to the second security algorithm.

17. The apparatus according to claim 16, wherein the at least one memory and the computer program code are further configured to cause the apparatus to perform the restarting of the securing of the Radio Access Network traffic by at least one of restarting ciphering the Radio Access Network traffic, restarting protecting the integrity of the Radio Access Network traffic, and deriving at least one of a new ciphering key and a new integrity protection key.

18. The apparatus according to claim 14, wherein the apparatus is included in the mobile station.

19. A method, comprising:

sending, from a first Node-B, a Context Transfer message to a second Node-B indicating that a User Equipment is about to be handed over from the first Node-B to the second Node-B, where the handover indication message indicates a plurality of security algorithms which the User Equipment supports;

in response to sending the Context Transfer message, receiving, at a processor of the first Node-B, a Context Transfer acknowledgement message from the second Node-B indicating that the second Node-B requires use of a second security algorithm from the plurality of security algorithms which the User Equipment supports; and in response to receiving the Context Transfer acknowledgement message, sending, to the User Equipment using a first security algorithm, a Handover Command message instructing the User Equipment to handover to the second Node-B and to use the second security algorithm in communication with the second Node-B, where the first security algorithm is different from the second security algorithm.

20. A method, comprising:

receiving, from a first Node-B at a User Equipment using a first security algorithm, one of a Handover Command message and a Security Mode Command message instructing to use a second security algorithm required by a second Node-B; and in response to receiving the one of the Handover Command message and the Security Mode Command message, changing to use the second security algorithm at the User Equipment in communication with the second Node-B, wherein the received one of the Handover Command message and the Security Mode Command message is received from the first Node-B further instructing the User Equipment to handover to the second Node-B, where the first security algorithm is different from the second security algorithm.

21. An apparatus, comprising at least one processor; and at least one memory including computer program code, the at least one memory and the computer program code configured to, with the at least one processor, cause the apparatus to perform at least the following:

to send, from the apparatus, a Context Transfer message to a second Node-B indicating that a User Equipment is about to be handed over from the apparatus to the second Node-B, where the handover indication message indicates a plurality of security algorithms which the User Equipment supports;

in response to sending the Context Transfer message, receiving, at the apparatus, a Context Transfer acknowledgement message from the second Node-B indicating that the second Node-B requires use of a second security algorithm from the plurality of security algorithms which the User Equipment supports; and in response to receiving the Context Transfer message, to send, to the User Equipment using a first security algorithm, a Handover Command message instructing the User Equipment to handover to the second Node-B and to use the second security algorithm in communication with the second Node-B, where the first security algorithm is different from the second security algorithm.

22. An apparatus, comprising at least one processor; and at least one memory including computer program code, the at least one memory and the computer program code configured to, with the at least one processor, cause the apparatus to perform at least the following:

receiving, from a first Node-B at the apparatus using a first security algorithm, one of a Handover Command message and a Security Mode Command message instructing the apparatus to use a second security algorithm required by a second Node-B; and to change to use the second security algorithm required by a second Node-B in communication with the second Node-B in response to receiving the one of a Handover Command message and a Security Mode Command message, wherein the received one of the Handover Command message and the Security Mode Command message is received from the first Node-B further instructing the apparatus to handover to the second Node-B, where the first security algorithm is different from the second security algorithm.

23. A non-transitory computer readable medium tangibly encoded with a computer program executable by a processor to perform actions comprising:

sending, from a first access point, a handover indication message to a second access point indicating that a mobile station is about to be handed over from the first access point to the second access point, where the handover indication message indicates a plurality of security algorithms which the mobile station supports;

in response to sending the handover indication message, receiving, at the first access point, a security requirement message from the second access point indicating that the second access point requires use of a second security algorithm from the plurality of security algorithms which the mobile station supports; and in response to receiving the security requirement message, sending, from the first access point to the mobile station using a first security algorithm, a handover message instructing the mobile station to handover to the second access point and to use the second security algorithm in communication with the second access point, where the first security algorithm is different from the second security algorithm.

24. A non-transitory computer readable medium tangibly encoded with a computer program executable by a processor to perform actions comprising:

receiving, from a first access point at a mobile station using a first security algorithm, a security message instructing the mobile station to use a second security algorithm required by a second access point; and in response to receiving the security message, changing to use the second security algorithm at the mobile station in communication with the second access point, wherein the received security message is a handover message received from the first access point further instructing the mobile station to handover to the second access point, where the first security algorithm is different from the second security algorithm.

\* \* \* \* \*